No. 735,243. PATENTED AUG. 4, 1903.
R. T. GILLESPIE.
SHIFTING MECHANISM FOR TYPE WRITER CARRIAGES.
APPLICATION FILED MAY 31, 1902.
NO MODEL. 4 SHEETS—SHEET 2.
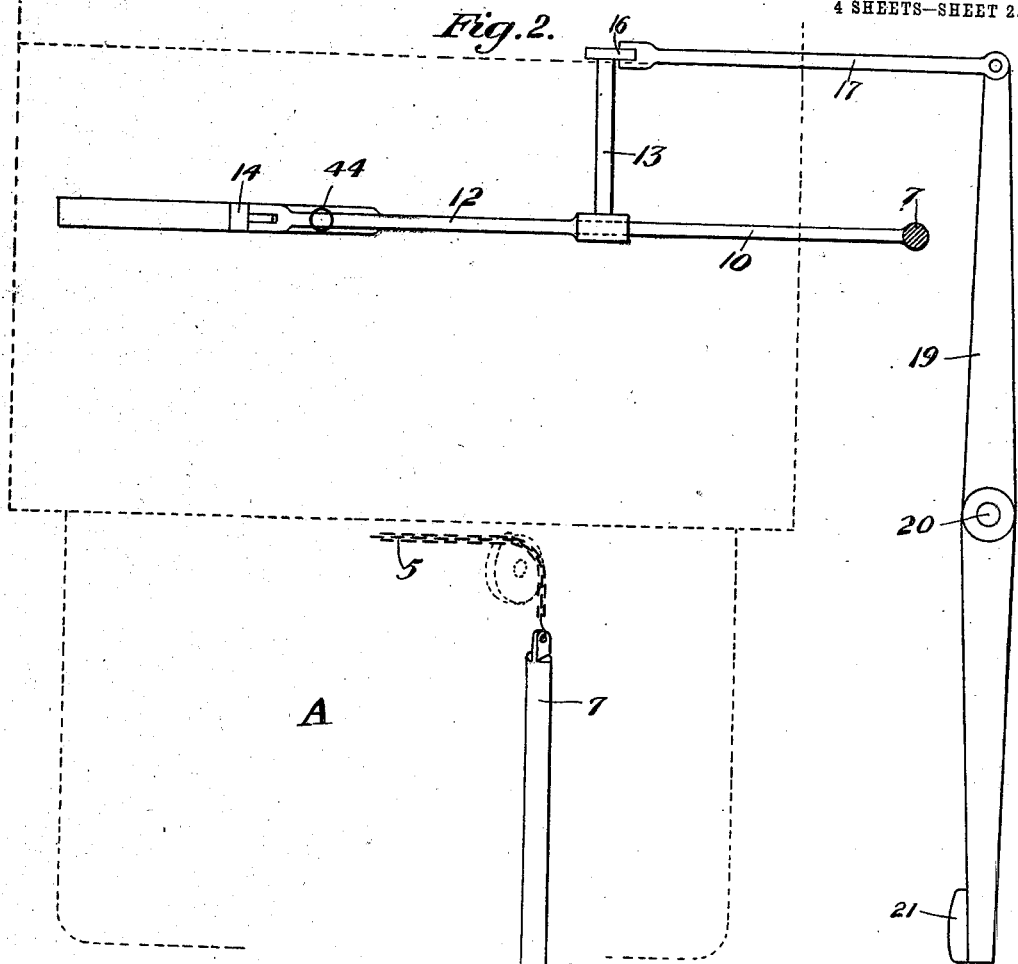
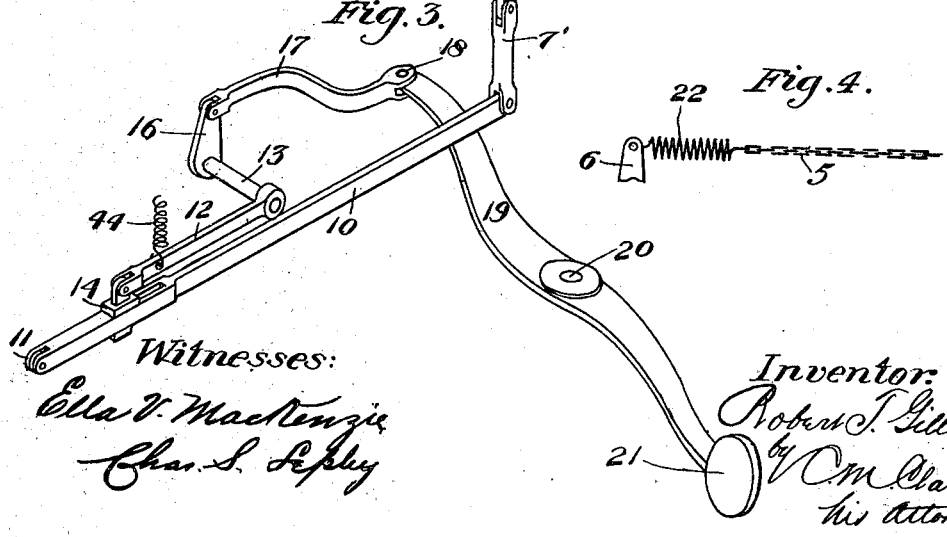
Witnesses:
Ella V. MacKenzie
Chas. S. Lepley
Inventor:
Robert T. Gillespie
by C. M. Clarke
his Attorney No. 735,243. PATENTED AUG. 4, 1903.
R. T. GILLESPIE.
SHIFTING MECHANISM FOR TYPE WRITER CARRIAGES.
APPLICATION FILED MAY 31, 1902.
NO MODEL. 4 SHEETS—SHEET 3.

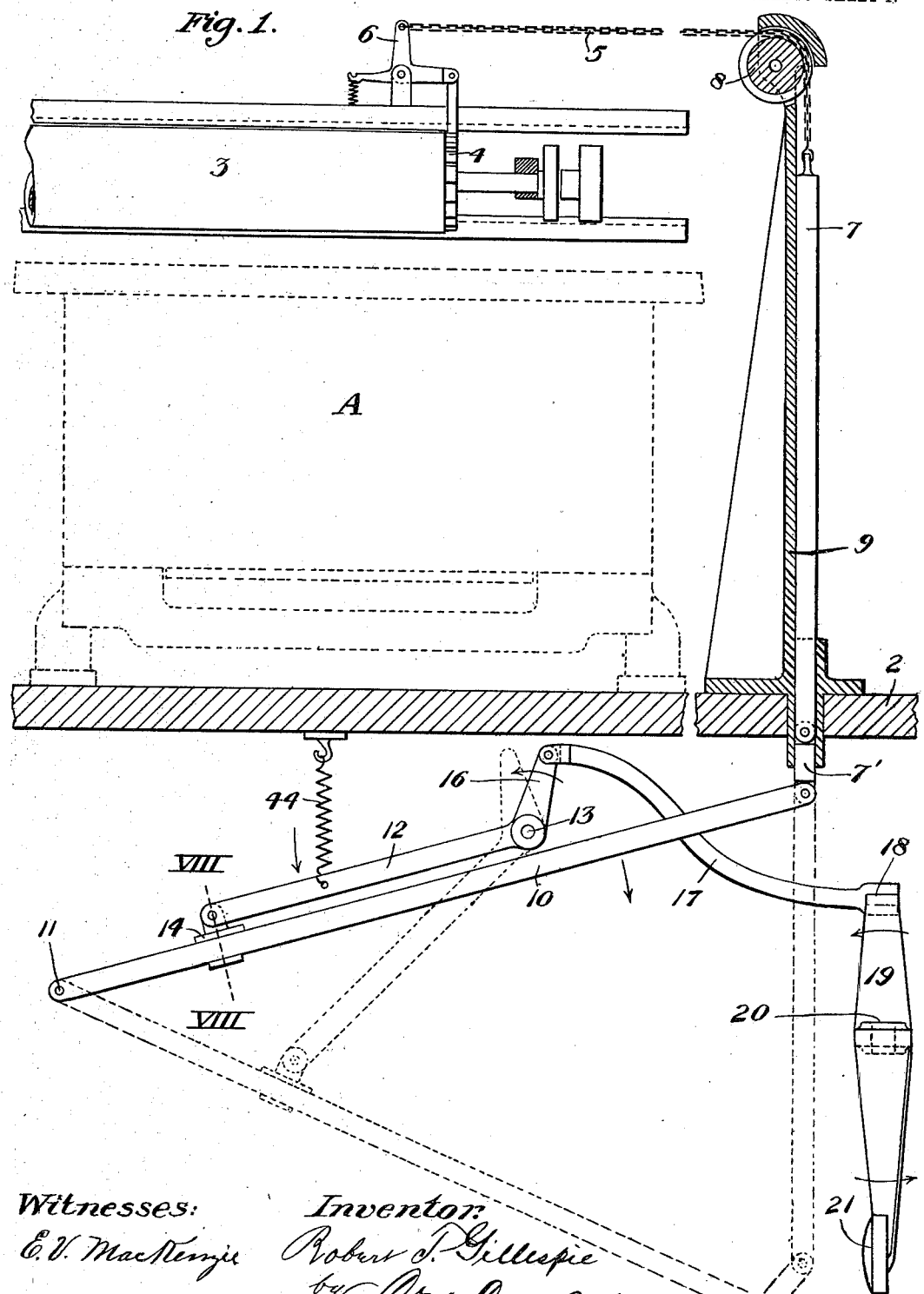

Witnesses:
E. V. Mackenzie
Chas. S. Sepley.

Inventor:
Robert T. Gillespie
by C. M. Clarke
his Attorney

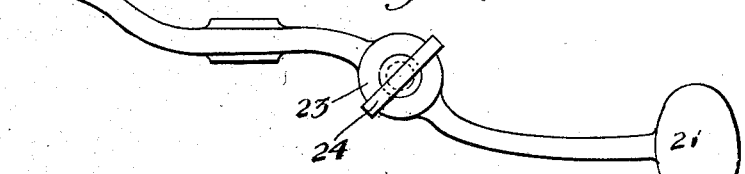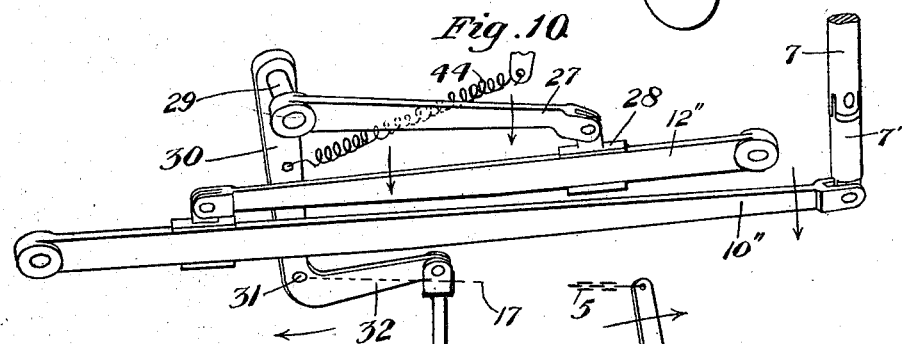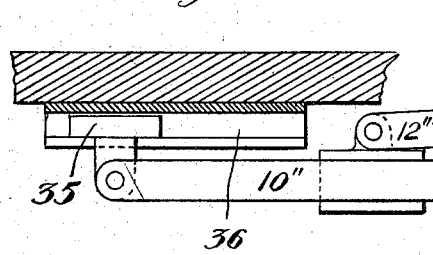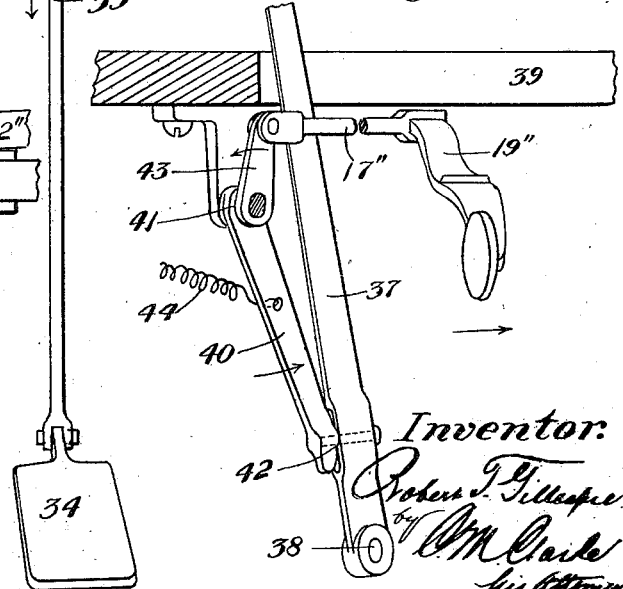

No. 735,243. Patented August 4, 1903.

UNITED STATES PATENT OFFICE.

ROBERT T. GILLESPIE, OF ROCHESTER, PENNSYLVANIA.

SHIFTING MECHANISM FOR TYPE-WRITER CARRIAGES.

SPECIFICATION forming part of Letters Patent No. 735,243, dated August 4, 1903.

Application filed May 31, 1902. Serial No. 109,736. (No model.)

*To all whom it may concern:*

Be it known that I, ROBERT T. GILLESPIE, a citizen of the United States, residing at Rochester, in the county of Beaver and State of Pennsylvania, have invented certain new and useful Improvements in Shifting Mechanism for Type-Writer Carriages, of which the following is a specification, reference being had therein to the accompanying drawings, forming part of this specification, in which—

Figure 5:
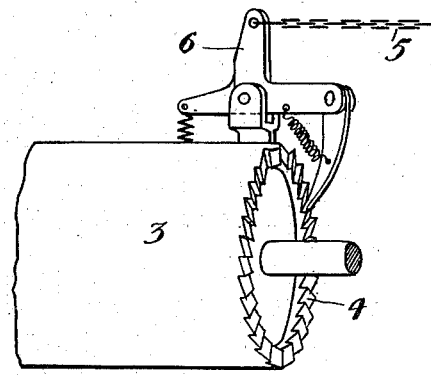
Figure 6:
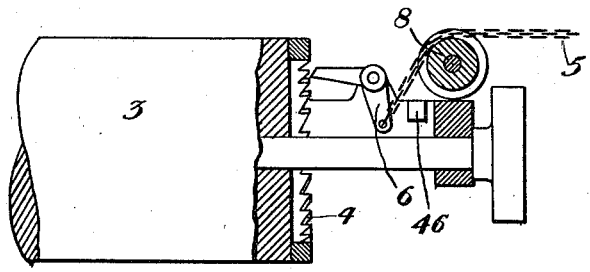
Figure 7:
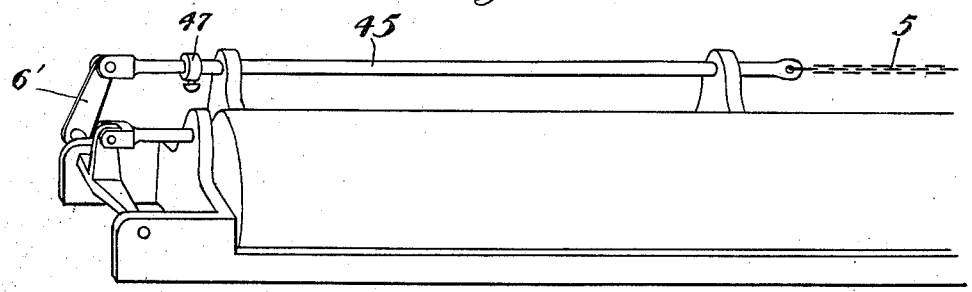
Figure 8:
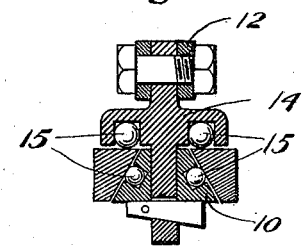

Figure 1 is a view of a type-writer, showing the application thereto of my improved carriage-shifting mechanism. Fig. 2 is a plan view of the shifting mechanism of Fig. 1. Fig. 3 is a perspective detail view of the mechanism. Fig. 4 is a detail view showing the attachment of the flexible connection with an intervening spring. Figs. 5, 6, and 7 are detail views showing the attachment of the flexible connection with various constructions of spacing-shifting devices embodying different types of machine. Fig. 8 is a cross-sectional detail view on the line VIII VIII of Fig. 1. Fig. 9 is a detail view of the knee-lever, showing a height-adjusting joint. Fig. 10 is a view similar to Fig. 9, showing a construction similar to that employed in the main figures of the drawings, whereby the operating-levers are adapted to be actuated by a connecting-rod to the knee-lever or by treadle mechanism. Fig. 11 is a detail sectional view of the pivoted end of the main operating-lever, showing means for permitting the pivotal bearing to slide backwardly and forwardly. Fig. 12 is a perspective view of a modified construction employing a vertically-arranged shifting-arm and means for actuating it through the knee-lever.

My invention relates to improved mechanism for the purpose of shifting the carriage of a type-writer otherwise than by the hands of the operator; and it consists of a connection adapted to be attached to the carriage, preferably to the paper-roll ratchet-lever, with means for drawing such connection backwardly, so as to bring the carriage to its initial position.

As is well understood, type-writers are ordinarily provided with means, usually a spring, by which the carriage is fed forward intermittently during and by means of the operation of the keys, and my invention is designed for the purpose of drawing the carriage back to the starting-point without necessitating the use of the hands. For this purpose I have designed an arrangement of levers adapted to be operated through pressure of the knee or by foot-pressure.

Referring now to the drawings, 2 represents the table upon which the type-writer (indicated by the letter A) is mounted in the usual manner, the platen 3 of which is rotatably mounted in a shifting carriage adapted to travel back and forth on the frame of the machine and to be partially rotated, usually by ratchet or pawl mechanism engaging teeth 4 on the end of the platen.

5 is a flexible device, either a chain, tape, cable, or other suitable material, attached to the operating-lever 6, by which the platen is rotated, the other end of which device is attached to a vertical reciprocating post 7, passing around an intervening guiding sheave-wheel 8, mounted in a suitable bracket. The post 7 is preferably mounted and guided in a housing 9 in such a manner that it will rise and fall therein under operation of the actuating mechanism, the flexible connection 5 always being under tension, due to the return-spring of the carriage. The lower end of the post 7 is connected, preferably, to an intervening connecting-rod 7' to one end of the lever 10, pivoted at the other end at 11, which lever is actuated downwardly by lever 12, pivoted at 13 in a suitable bearing and in sliding engagement with lever 10 at 14, adjacent to the pivotal bearing 11, by which construction it will be seen that a comparatively limited range of movement of the lever 12 will result in a very considerable travel of the outer end of the lever 10, as indicated in dotted lines, which amount of travel is sufficient to draw the connection 5 sufficiently far to shift the carriage clear back to its first position.

The pivotal slide connection 14 may merely engage a longitudinal slot in lever 10. or, if preferred, ball-bearings 15 may be inserted between the lever and the sliding joint in the manner clearly shown in Fig. 8, thereby reducing friction and contributing to the ease of the operation.

The lever 12 is provided with a short bell-crank extension 16, to which is attached a connecting-rod 17, which connecting-rod may be of any length or shape or which may extend in any direction desirable, either to the right or left, but preferably toward the right side of the table, and at the outer end it is pivoted or connected by a swivel-joint (indicated at 18) to the inner end of the knee-lever 19. The knee-lever is pivoted at 20 in a suitable bearing and extends forwardly within range of the knee of the operator and is provided with a pad or bearing-plate 21. By this construction a very slight outward movement of the knee will shift the knee-lever in the manner indicated by the arrow, imparting movement to the connecting-rods and lever 12, as indicated, by intervening levers, and due to their proportionate lengths and arrangement of fulcrums and bearing-points the desired movement is imparted to the flexible connection 5, resulting in an immediate and rapid shifting of the carriage in the manner indicated. In the first operation, ordinarily performed by hand, the platen is partially rotated before shifting the carriage, so that it will be seen that the entire operation is performed by the very limited movement of the knee without the necessity of removing the hands from the keyboard.

The end of the flexible connection 5 is connected primarily to the spacing-crank 6 or its equivalent, as indicated in Figs. 5 and 6, and it will be understood that such attachment may be made with various types or constructions of machines, so as to first actuate the platen to shift or space for a new line in the usual manner. In Fig. 7 I have shown a construction wherein such space-shifting lever 6' is located at the left-hand side of the machine, in which case I employ a rod 45, connected to lever 6', mounted in suitable bearings and extending toward the right side, where it is connected to the end of connection 5. For the purpose of permitting a slight initial independent movement of the connection, so as to accomplish the spacing shift before the carriage is carried over, the lever 6 or 6' is adapted to be moved first the required distance, when it will come into contact with any suitable stop or abutment 46 or an abutment 47, preferably adjustable, attached to rod 45. After the first independent movement of the space-shifting mechanism the contact with such abutment will cause the pulling action of the connection to be transmitted to the carriage, causing it to travel over to the first position. For the purpose of overcoming the sudden strain or jar on the platen an elastic device, as a spring 22, Fig. 4, may be inserted between the shifting-lever 6 and the connection 5, preferably at the end of the connection, closely adjacent to the lever, as shown.

When it is desired to provide means for adjusting the outer end of the knee-lever up or down, I provide the joint 23, (shown in detail in Fig. 10,) the outer portion of the lever being made in two parts with circular corrugated interfitting faces adapted to engage each other and to be clamped together by a thumb-screw 24 in the manner well understood, by which the knee-pad 21 may be lowered or raised to suit each individual operator.

In Fig. 10 is shown an arrangement of levers wherein the lever 10″ and its actuating-lever 12″ are thrown downwardly by a third lever 27, in sliding engagement at 28 with lever 12″ and pivotally supported on a shaft 29, mounted in a bearing depending from underneath the table. Secured to shaft 29 and extending downwardly therefrom is a crank-arm 30, provided with a hole 31, to which the connecting-rod 17 may be connected, as indicated in dotted lines, while the crank-arm is deflected to one side, providing a crank-terminal 32. The end of such terminal is designed to be connected to the upper end of a treadle-lever rod 33, attached at its lower end to a suitable treadle 34, by which the proper movement may be imparted to crank 30 and through the system of levers finally exerting the desired downward pull on post 7 to actuate the flexible connection 5.

It will be observed that in both of the last two described arrangements of levers and actuating mechanism the levers are arranged horizontally, so that they may be located within a comparatively limited space immediately below the table, which is of advantage in economizing room, while giving the full range of movement desired.

In Fig. 11 is shown in detail a sliding joint for the pivotal end of lever 10″, attached to a shoe 35, slidingly mounted in a runner box or bearing 36, secured underneath the table, by which construction the forward end of lever 10″ may be connected directly to the lower end of post 7, the sliding joint permitting the lever to reciprocate back and forward during its up and down travel.

In Fig. 12 is shown a construction wherein a vertical lever 37 is provided, pivoted at its lower end 38 in any suitable bearing below the table, extending upwardly through a slot 39 therein in alinement with the carriage, and connected at its upper end with the connection 5. A lever 40, pivoted at 41 in a suitable bearing depending from the table, is slidingly connected at 42 with the lower portion of lever 37 adjacent to its pivotal bearing, the lever 40 being actuated by a short crank-arm 43 through connecting-rod 17″ and knee-lever 19″, as already described. This latter construction is simple and effective and for some designs of machines is desirable and suitable.

In all of the various arrangements of levers a retracting-spring 44 is secured to one of the actuating-levers, as already shown, so that at the termination of the operation of drawing the carriage forward and upon releasing pressure of the knee or foot the spring will automatically reverse the operation and will cause the levers to resume their normal initial position independent of the carriage-spring.

A buffer for the knee-lever is located at any convenient position in its path of movement. It will be understood that a counterweight of any suitable or desired construction may be substituted for such spring, if preferred.

The advantages of my invention will be appreciated by all those familiar with the art, and its operation will be readily understood from the foregoing description.

Changes and variations may be made by the skilled mechanic in the arrangement, design, or details of construction without departing from my invention, but all such are to be considered as within the scope of the following claims.

What I claim is—

1. Mechanism for shifting a type-writer carriage consisting of a lever, a connection between the lever and the carriage, a second lever having a sliding connection between its end and the first lever adjacent to the fulcrum of the first lever, an independent laterally-movable actuating-lever, and a connection between the said lever and the second lever, substantially as set forth.

2. Mechanism for shifting a type-writer carriage consisting of a lever, a connection between the lever and the carriage, a second lever having a sliding connection between its end and the first lever adjacent to the fulcrum of the first lever, an independent laterally-movable actuating-lever, and a connection between said lever and the second lever, with means for returning the levers to normal position, substantially as set forth.

3. Mechanism for shifting a type-writer carriage consisting of a lever, a connection between the lever and the carriage, a second lever having a sliding connection between its end and the first lever adjacent to the fulcrum of the first lever, a knee-lever having a joint for vertical adjustment of its bearing end, and a connection between the knee-lever and the second lever, substantially as set forth.

4. Mechanism for shifting a type-writer carriage consisting of a lever, a vertical reciprocating post connected therewith, a flexible connection between the post and the carriage, guiding devices for the post and connection, a second lever adapted to actuate said lever, an actuating-lever, and a connection therefrom to the second lever.

5. Mechanism for shifting a type-writer carriage consisting of a lever, a vertical reciprocating post connected therewith, a flexible connection between the post and the carriage, guiding devices for the post and connections, a second lever adapted to actuate said lever, an actuating-lever, a connection therefrom to the second lever, and means for returning the levers to normal position.

6. Mechanism for shifting a type-writer carriage consisting of a lever, a vertical reciprocating post connected therewith, a flexible connection between the post and the carriage, guiding devices for the post and connection, a second lever adapted to engage said lever near its fulcrum, a third lever adapted to engage and actuate said second lever, and means for actuating said third lever, substantially as set forth.

7. Mechanism for shifting a type-writer carriage consisting of a lever, a connection between the lever and the carriage, a second lever adapted to engage said lever near its fulcrum, a third lever adapted to engage and actuate said second lever, and means for actuating said third lever, substantially as set forth.

8. Mechanism for shifting a type-writer carriage consisting of a lever, a connection between the lever and the carriage, a second lever adapted to engage said lever near its fulcrum, a third lever adapted to engage and actuate said second lever, means for actuating said third lever, and means for returning the levers to normal position, substantially as set forth.

In testimony whereof I affix my signature in presence of two witnesses.

ROBERT T. GILLESPIE.

Witnesses:
  JAS. J. MCAFEE,
  C. M. CLARKE.